Figure 3:
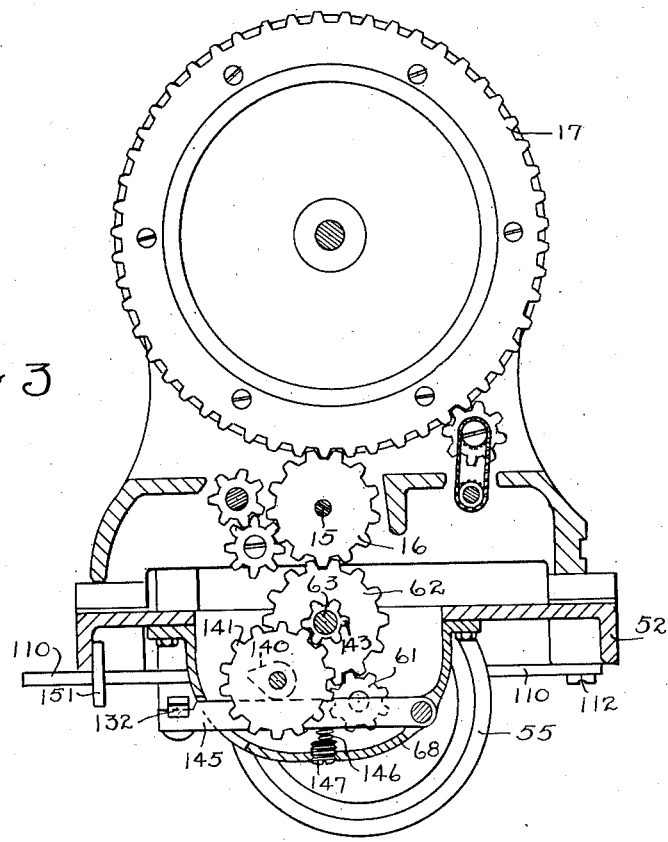

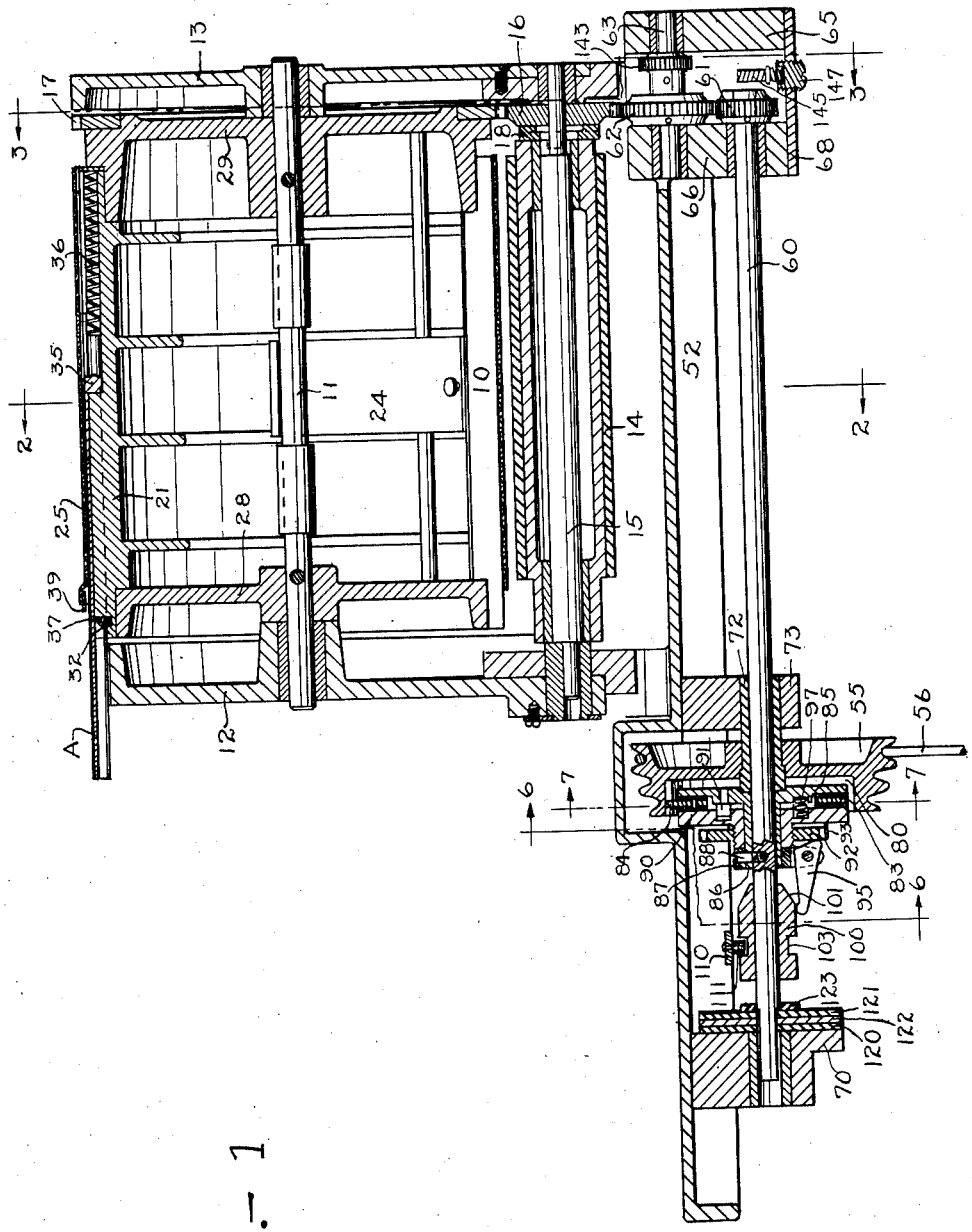

May 8, 1928.

H. C. OSBORN

POWER DRIVE MECHANISM

Filed June 4, 1926    5 Sheets-Sheet 2

Inventor
Henry C. Osborn,
By Bates, Macklin, Golrick & Fear
Attorneys

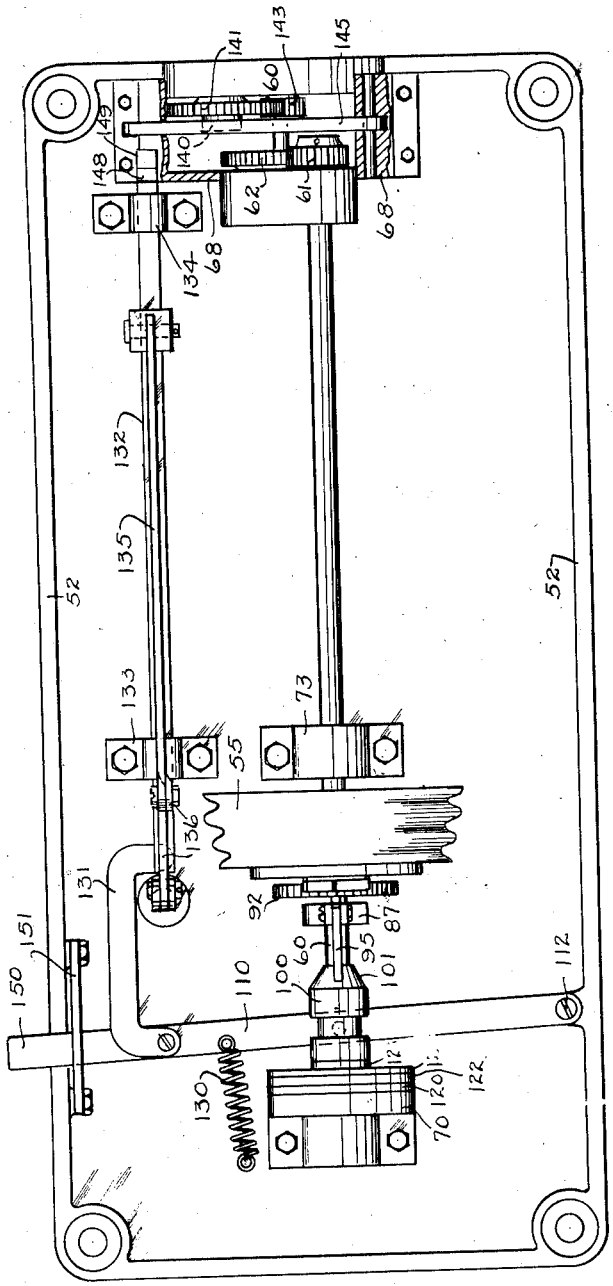

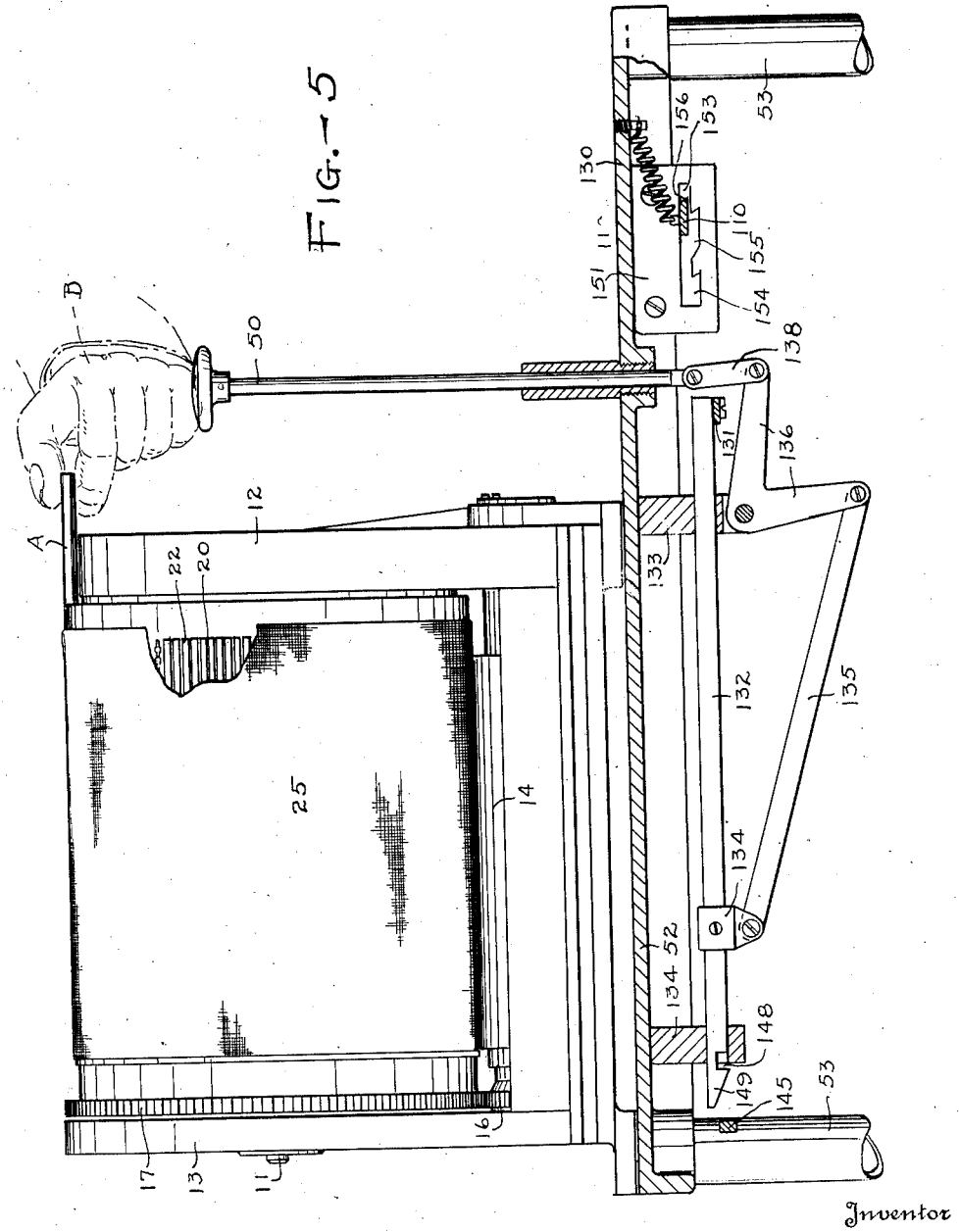

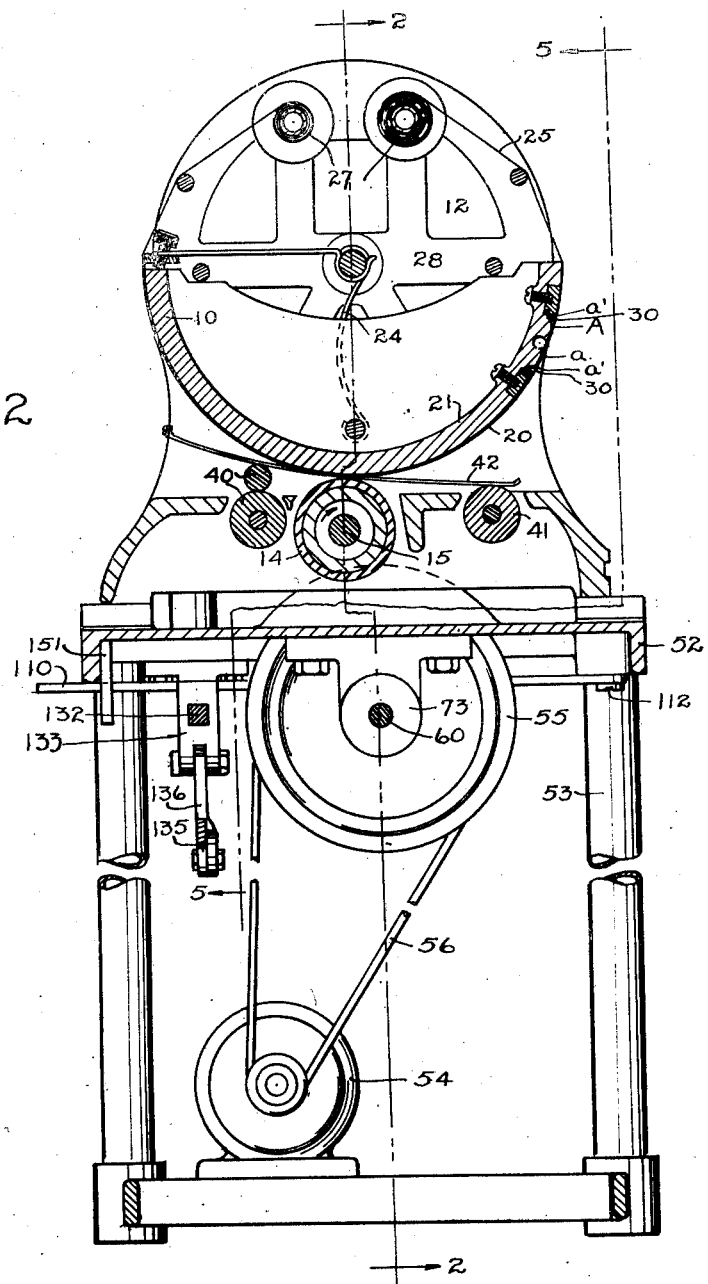

Patented May 8, 1928.

1,668,866

UNITED STATES PATENT OFFICE.

HENRY C. OSBORN, OF CLEVELAND, OHIO, ASSIGNOR TO THE AMERICAN MULTI-GRAPH COMPANY, OF CLEVELAND, OHIO, A CORPORATION OF OHIO.

POWER DRIVE MECHANISM.

Application filed June 4, 1926. Serial No. 113,601.

This invention relates to a mechanism adapted to be coupled with a continuously operating source of power for delivering controlled periodic rotations to the driven machine, as for instance a rotary printing machine. More particularly the power drive is controlled by a manually operable member and when released gives a single rotation to the printing machine, stopping the same subject to a succeeding release.

My power drive mechanism is well adapted for driving a multigraph. It is especially useful where the multigraph is equipped with a manually changeable address plate, as shown for instance in application No. 100,224 of John B. Hult. When so embodied the manual controller for the power drive preferably acts as a rest for the operator's hand when in position to insert or receive a plate on the multigraph drum, and thus the operator, by practically one movement, may insert the plate on the drum, depress the manual control to start the operation of printing from that plate, and retain his hand in position to receive the plate discharged at the end of the rotation.

The above characteristics, and others which are comprised within my invention, will be hereinafter described in connection with a preferred embodiment of the invention illustrated in the drawings hereof, and the essential characteristics will be summarized in the claims.

Figures 6, 7:
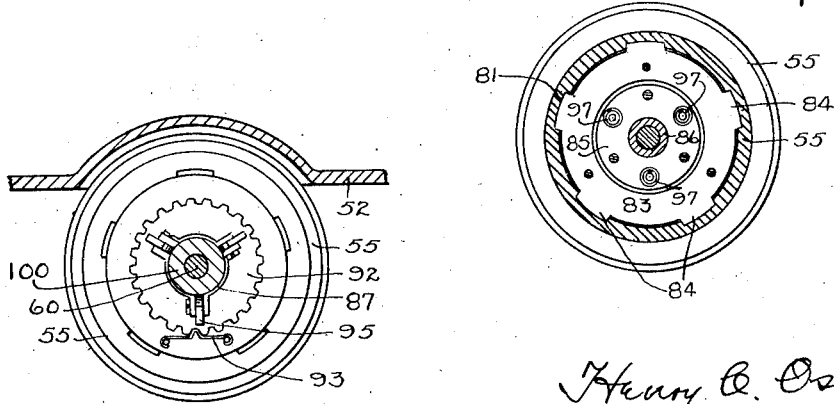

In the drawings, Fig. 1 is a vertical section through my power drive and a surmounting multigraph with which it operates, as indicated by the line 1—1 on Fig. 2; Fig. 2 is a vertical transverse section through the same parts and the stand for the complete mechanism as indicated by the line 2—2 on Fig. 1; Fig. 3 is a vertical section on a line 3—3 of Fig. 1 looking in the same direction as Fig. 2; Fig. 4 is a bottom plan of the power drive mechanism itself, the gear casing cover being broken away; Fig. 5 is a sectional rear elevation of the line 5—5 on Fig. 2; Figs. 6 and 7 are vertical transverse sections through the clutch on the planes indicated by the correspondingly numbered lines on Fig. 1.

The multigraph machine shown in Figs. 1, 2, 3 and 5 comprises a rotary drum 10 mounted on a shaft 11, journalled in end frame plates 12 and 13 above a roller platen 14 mounted on a shaft 15. Gearing 16 and 17 and an Oldham coupling 18 connect the drum and platen.

I have shown, mounted on the drum, means for printing the body of a form letter, such means comprising a blanket 20 (shown conventionally in Fig. 2) stretched about a segment 21 on the drum and having raised overhanging members 22 (Fig. 5) for carrying embossed printing strips, not shown. The segment is shown as a semi-cylinder resting on the end members 28 and 29 (Fig. 1) of the drum and held in place by a spring hook 24 engaging the shaft 11. An inking ribbon 25 is shown as mounted on spools 27 carried between the end members of the drum, such ribbon extending intermediately about the printing form.

The paper may be fed to the multigraph manually or automatically as desired. I have shown no feeding mechanism, but have indicated at 40, Fig. 2, a pair of coacting rolls which may be operated as will be well understood to control the feed. This view also shows an ejector roll 41 coacting with a stripper spring 42.

The multigraph machine is shown as provided with a pair of adjacent longitudinal channels 30 for the reception of an address plate A, has an intermediate printed portion $a$ and downwardly turned outwardly projecting edge portions $a^1$. The channels are undercut to receive these edge portions. These channels lead from one end of the drum (the left hand end, Fig. 1) so that the address plate may be readily shoved into place. When so shoved it engages an abutment 35 and presses it toward the right against the action of a coil spring 36 until the plate is held by a latch 37 engaging its left hand end. The channels 30 may be bridged adjacent their entrance by a thin arcuate strip 39 lying beneath the edge portion of the ribbon 25, enabling the ready insertion of the plate beneath the ribbon. The latch is spring pressed outwardly into an engaging position by a spring beneath it indicated at 32 in Fig. 1. The latch may be engaged by a fixed abutment (not shown) or manually by the operator's finger and pressed inwardly to release the plate at about the conclusion of an operative rotation and thereupon the spring 35 will eject the plate sufficiently so that it may be readily grasped by the operator's hand as indicated in Figs. 1 and 5.

Reference is made to the pending application of John A. Hult for a fuller description of the features controlling the address plate. It will however, be understood from a brief description here given that on each rotation of the drum, the latch is released either manually or automatically and the plate discharged and another plate inserted in its place and retained by the latch during the next rotation of the drum started. This may all be effected by the left hand of the operator, as indicated at B in Fig. 5, such hand resting on a vertically movable plunger 50, depression of which starts the operation of the machine through my power drive.

The power drive shown, independently of the hand operating member thereof, is claimed in my divisional application No. 139,257, filed Oct. 4, 1926.

It may be described as follows:—

The frame of the power drive comprises a horizontal bed plate 52 which rests on the top of a usual standard 53 which supports the driving motor 54. The multigraph machine rests on top of this bed plate. The power drive supports on its underside a pulley 55 connected by a belt 56 with the motor, and has a clutch controlled by the plunger 50 to connect such pulley with a shaft 60 which is geared with the multigraph machine.

The gearing connecting the power drive shaft 60 with the multigraph is best shown in Figs. 1, 3 and 4, and comprises a pinion 61 on the end of the shaft meshing with an idler gear 62 on a lay shaft 63, which idler meshes with the platen gear 16, which as heretofore stated meshes with the gear 17 on the multigraph drum. The lay shaft 63 is mounted in an end wall 65 of the bed plate 52 and a parallel depending web 66 of that plate. The left hand end of the shaft 60 is also mounted in such web. Beneath the web and the end wall is a removable bottom plate 68, these parts constituting a gear casing.

The main shaft 60 of the power drive is journalled at its left hand end in a bracket 70 depending from the bed plate 52. Intermediately it passes through a hub sleeve 72 of the pulley 55 which is journalled in a depending frame bracket 73. The pulley 55 as shown is conical, having several grooves of different diameter to receive the belt 56 from a reversely coned pulley on the motor 54. The pulley 55 also acts as one member of the manually controlled clutch about to be described.

The pulley 55 has in its left hand face Fig. 1, a circular recess 80 with several notches 81 at the periphery of the recess as shown more particularly in Fig. 7. Within this recess is a floating clutch disk 83, preferably faced on its opposite sides with leather, and having ears 84 occupying the notches.

This disk is thus compelled to rotate with the pulley, but being shiftable axially with reference thereto. On the right hand side of the disk in Fig. 1 is a disk 85 which is rigid with the shaft, this disk being shown as having a sleeve 86 surrounded by a collar 87, both the collar and the sleeve being pinned to the shaft by a pin 88. Slidable on the sleeve 86 is another clutch member 90 which lies on the left hand side of the floating member 83. The disk 85 carries a pin 91 slidably occupying a hole in the disk 90, and thus these two disks cannot rotate independently. The disk 90 has a sleeve on which is threaded a disk 92. The threading enables the adjustment of the disk but it is held against displacement by a spring 93 (Fig. 6) engaging any one of a number of notches in the periphery of the disk.

Pivoted to the collar 87 (which is rigid on the shaft 60) are cam levers 95, of which three are shown, which bear at their inner edges against the disk 92 and at their outer or left hand ends against the exterior of a shiftable operating collar 100. This shiftable collar, which is splined on the shaft 60 to rotate with it, has a conical inner end 101 adapted to swing the coacting ends of the levers and thus cam the clutch disk 92 toward the right, when the collar is moved toward the right, Fig. 1, as it may be by an operating lever 110, which carries a roller 111 occupying a groove 103 in the collar.

When the collar 100 is relatively distant from the clutch, compression springs 97 force the disk 83 toward the left, thus freeing the constantly rotating member 81. When the collar 100 is forced toward the right, the levers 95 are swung outwardly thus forcing the disk 90 toward the right and binding the leather faced disk 83 between the two clutch members 90 and 85, thus locking the clutch pulley 55 to the shaft 60.

It will be seen from the above description that when the collar 100 is shifted toward the right, Fig. 1, the clutch is engaged and the shaft 60 rotated and the multigraph drum and platen rotated accordingly. On the other hand, when the collar is shifted to the left, the clutch is free so that the driving of the shaft ceases.

To prevent further rotation of this shaft to momentum, when the clutch is released, I provide a very simple brake controlled by the left hand movement of the clutch collar. This, as shown, consists of a pair of leather disks 120 and 121 and an intermediate steel disk 122 all splined on the shaft 60 and adapted to bear against the adjacent face of the bearing bracket 70. A suitable washer 123 bears against the right hand end of the disk 121. When the clutch collar 100 is moved to its left hand position its end abuts this washer 123 and applies this brake, immediately stopping the rotation of the shaft 60. When the clutch collar is shifted away from this brake, the disk members may rotate with the shaft without material frictional drag against the frame bracket.

The lever 110 which operates the clutch collar 100 to apply the clutch or brake, is pivoted at 112 to the frame adjacent its rear edge. A tension spring 130 anchored to the frame and to this lever tends to maintain it in position with the brake set. The lever is connected by a link 131 (Fig. 4) to a sliding bar 132 mounted in ears 133 and 134 on the underside of the frame plate 52. This bar is connected by a link 135 (Fig. 5) with one arm of a bell crank 136 which is pivoted to the ear 133 depending from the frame. The other arm of the bell crank is connected by a link 138 with the manual plunger 50.

It results from the linking described that when the plunger 50 is depressed, the bar 132 is shoved toward the left in Fig. 5 (that is, toward the right in Figs. 1 and 4), setting the clutch and causing rotation of the drive shaft 60. This rotation continues as long as the plunger remains depressed. It may be held down manually or the parts may be locked in such engaged position by means hereinafter described, but ordinarily it is latched by mechanism which is released at the end of a rotation, thus giving periodic single rotations to the multigraph machine. This latching mechanism will now be described.

Suitably geared with the multigraph drum so as to make one rotation for each rotation of the drum is a cam 140 (Fig. 3). As shown, this cam is on the side of a gear 141 which is mounted on a stub shaft carried by the end wall 65 of the frame. This gear meshes with a pinion 143 rigid with the gear 62 on the lay shaft 63. The cam 140 coacts with a lever 145 pressed upwardly by a spring 146 shown as adjustable by a screw 147 mounted in the gear casing cover 68. The lever 145 coacts with the bar 132 and is adapted to occupy a notch 148 therein and retain that bar against return movement until the lever 145 is depressed.

Whenever the plunger 50 is shoved down, as heretofore described, it carries the bar 132 to the left in Fig. 5, the beveled end 149 camming the lever 145 downwardly and the spring 146 returning this lever into the notch 148. This engagement holds the bar 132 when the pressure of the operator's hand is removed from the plunger 50, and thus the clutch remains in engagement as the rotation continues. However, as the rotation is just being completed, the cam 140 shoves downwardly on the bar 145, releasing it from the bar 132 and the latter is returned by the spring 130, thus releasing the clutch.

It will be seen that I have provided a very readily operable single-rotation clutch. A single downward pressure on the plunger 50 causes the clutch to engage; then, whether that pressure is continued or not, the clutch rotates for at least a rotation. If the pressure is continued beyond that rotation, the clutch continues engaged for a subsequent rotation or rotations. If however, the pressure is relieved at any time during a given rotation the movement stops at the completion of that rotation.

It is sometimes desired to lock the clutch continuously in engagement, or lock it in disengaged position so that the machine may be turned freely by hand. To accomplish this I provide the following mechanism:

The shipper lever 110 extends forwardly of the frame in position to be readily engaged by the operator at 150. This lever passes through a slotted keeper plate 151 (Figs. 4 and 5) secured to and depending from the front wall of the frame 52. In ordinary operation, the lever oscillates in the upper and uninterrupted portion 153 of the slot in the keeper. However, this slot has two downward extensions 154 and 155, Fig. 5, each with an inwardly inclined end on the side toward which the spring 130 tends to draw the lever 110. The corresponding edge of the lever 110 is correspondingly beveled, as shown at 156, Fig. 5.

It results from the mechanism described that as the lever 110 is forced downwardly into either of the extension notches 154 or 155, the effect of the spring 130 is to hook the lever beneath the overhanging end of the slot and retain it in this position. When the lever is in the notch 154, the clutch is engaged and will remain so for continuous rotations until the lever is released. When the lever is in the notch 155 the shipper collar 100 is in an intermediate position and neither is the clutch applied nor the brake engaged. The result is that the printing machine is entirely free from the power drive and may be turned by hand as desired.

It will be seen that I have provided a simple and efficient power drive coupled with a control readily actuated by the hand of the operator while that hand is performing another necessary operation about the machine. The arrangement of the manual control in the form of a rest for the operator's left hand in the position which that hand naturally occupies in placing an address plate on the drum or receiving it therefrom, is efficient in saving movement for the operator, and leaving his right hand free to drive the machine.

Having thus described my invention, I claim:

1. The combination, with a printing machine adapted to carry a removable address plate, of a power drive for said machine, and a manual controlling device for the power drive, having an operating member adapted to be manipulated by the operator's hand when in position to manipulate the address plate with reference to the printing machine.

2. The combination, with a printing machine adapted to carry a removable address plate manually positioned thereon, of a power drive for said machine and a manual controlling device for the power drive, having an operating member adapted to serve as a rest for the operator's hand, when in position to manipulate the address plate with reference to the printing machine.

3. The combination of a rotary drum adapted to carry an address plate shoved thereonto from beyond one end of the drum, power mechanism for rotating the drum, controlling mechanism for such power mechanism including a manually operable member adjacent the end of the drum and adapted to be engaged by the hand of the operator.

4. The combination of a rotary drum adapted to carry an address plate shoved thereon from beyond one end of the drum, power mechanism for rotating the drum, controlling mechanism for such power mechanism including a manually operable member adjacent the end of the drum and serving as a hand rest for the operator when in position to place an address plate on the drum or receive it therefrom.

5. The combination of a rotary drum having a longitudinal guideway for a removable address plate, power mechanism for driving the drum including a shaft geared with the drum and a clutch for controlling the shaft, a plunger and mechanism operable thereby for controlling the clutch, said plunger terminating at its upper end beyond the end of the drum and a sufficient distance below the path of installation or removal of the address plate to enable the operator's hand to mount the plate on the drum and operate the plunger to start the rotation of the drum.

6. The combination, with a suitable support, of a frame plate carried thereby, a rotary printing machine mounted on a plate, a power drive mechanism mounted on the underside of the plate, geared with the printing machine and including a clutch, a vertically movable plunger beyond one end of the printing machine, said plunger being connected with the mechanism for setting the clutch whereby the depression of the plunger may set the clutch, said drum having a guideway for an address plate leading from that end of the drum adjacent the plunger, whereby the hand of the operator may readily manipulate the address plate with reference to the drum and operate the plunger.

7. The combination with a stand, of a frame plate mounted on top thereof, a rotary printing machine mounted on a plate, a power drive mechanism carried by the plate, geared with the printing machine and including a clutch, a vertically movable plunger beyond one end of the printing machine, said plunger being connected with the mechanism for setting the clutch whereby the depression of the plunger may set the clutch, a cam geared with the drum and acting once for each rotation of the drum for disconnecting the clutch, said drum having a guideway for an address plate, leading from that end of the drum adjacent the plunger.

8. The combination, with a suitable support, of a frame plate carried thereby, a rotary printing machine mounted on the plate and having a printing drum and platen, a power drive mechanism mounted on the underside of the plate and geared with the printing machine and including a clutch, a vertically movable plunger beyond one end of the printing machine, said plunger being connected with the mechanism for setting the clutch whereby the depression of the plunger may set the clutch, a cam geared with the printing machine and acting once for each rotation of the drum for disconnecting the clutch, said drum having a guideway for an address plate leading from that end of the drum adjacent the plunger, whereby the hand of the operator may readily insert the address plate onto the drum and operate the plunger.

In testimony whereof, I hereunto affix my signature.

HENRY C. OSBORN.